Figure 1:
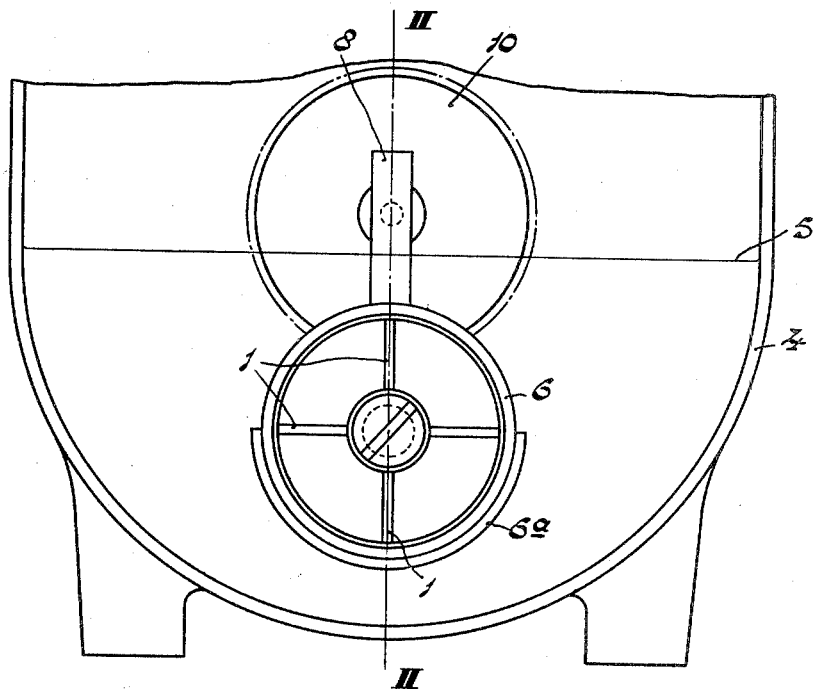

INVENTOR
GEURT JANSEN
BY
AGENT

United States Patent Office 2,770,330
Patented Nov. 13, 1956

2,770,330

BRAKING DEVICE

Geurt Jansen, Eindhoven, Netherlands, assignor to Hartford National Bank and Trust Company, Hartford, Conn., as trustee Application July 5, 1952, Serial No. 297,238

Claims priority, application Netherlands August 18, 1951

4 Claims. (Cl. 188—90)

This invention relates to apparatus, for example, electric motors of the kind comprising a braking device having a blade wheel which is rotatable in a liquid contained in a vessel. Braking devices of this kind may be used with apparatus which must be adapted to stop immediately upon the interruption of the supply of the energy driving the apparatus in order to operate correctly. Without a braking device the apparatus would continue its operation for some time owing to the kinetic energy still available.

An example of such apparatus is an electric motor used as a motor for the adjustment of the voltage to be supplied by a control-transformer. As long as the voltage supplied by the transformer differs from the desired value, the motor remains connected to the electrical source of energy; when the correct voltage of the transformer is reached, the supply of electrical energy to the motor is automatically interrupted. Owing to the kinetic energy accumulated in the motor, it continues rotating for some time, so that the desired adjustment of the transformer voltage is again lost and hence the motor is re-energized, but now in the opposite sense. Thus the adjustment of the transformer voltage goes on oscillating for some time about the correct position and hence the desired transformer voltage is not obtained or obtained only after a long time.

A braking device of the aforesaid kind may provide that the motor stops substantially immediately when the desired adjustment of the transformer voltage is reached.

This kind of braking device has a limitation in that during the normal operation of the apparatus the braking force exerted by the braking device must be overcome. Thus the apparatus must have greater power than it strictly requires to fulfill its function.

The object of the present invention is to obviate the aforesaid limitation, the advantages of the braking device being, however, maintained.

According to the invention an apparatus, for example an electric motor, comprising a braking device having a blade wheel which is rotatable in a liquid contained within a vessel is characterized in that the blade wheel is surrounded by a cylindrical sheath also contained within the vessel and being at least substantially closed at the end surfaces and being provided with apertures, the dimensions and arrangement of blade wheel, the cylindrical sheath and the apertures, and the viscosity of the liquid and the speed of rotation of the blade wheel being such that the liquid, contained in the cylindrical sheath when the blade wheel stands still, is conveyed for the major part, out of the sheath into the vessel, through the apertures, at the operational number of revolutions of the motor, provision being made of means by which, upon a drop in the speed of rotation below the operational speed of rotation the air contained in the sheath is driven out of the sheath owing to the reflow of the liquid. This has the advantage that at the operational number of revolutions the loss of energy due to the braking effect is considerably reduced. With a correct choice of the dimensions and the arrangement of blade wheel, cylindrical sheath and apertures, of the viscosity of the liquid and the speed of rotation of the blade wheel the liquid contained inside the sheath is set rotating, when the apparatus is started and the centrifugal force conveys it through the apertures for the major part out of the sheath into the vessel. Then the blades rotate mainly in air, so that the braking force decreases considerably. At the operational speed of rotation this condition is maintained, if the cylindrical sheath is at least substantially closed at the end surfaces. Thus the liquid is prevented substantially from re-entering the sheath via the end surfaces. The best results are, of course, obtained, if the cylindrical sheath is completely closed at its end surfaces. However, with a view to the driving of the blade wheel, which must be carried out via one of the end surfaces, the complete closure of the cylindrical sheath at the end surfaces would require a liquidtight stuffing of the kind used between a stationary part and a moving part. It may be preferred to dispense with this comparatively costly liquidtight stuffing and to accept the disadvantage involved that a small quantity of liquid leaks into the cylindrical sheath. Moreover, with particular embodiments one of the walls of the vessel may at the same time be used to close one of the surfaces of the cylindrical sheath. In view of the tolerances in the manufacture it may be desirable to maintain a slight amount of play of, for example, ½ to 1 mm. between the wall of the vessel and the cylindrical sheath.

As soon as the speed of rotation of the apparatus drops below the operational speed of rotation, when the supply of energy to the apparatus is interrupted, the equilibrium between the centrifugal force exerted on the liquid and the pressure of the liquid is disturbed. Then the liquid penetrates through the apertures into the cylindrical sheath, so that the blade wheel meets heavy resistance and the apparatus stops substantially immediately. The reflow of the liquid is facilitated by the provision of means through which the air contained in the cylindrical sheath at the operational number of revolutions can readily escape. Thus rapid braking of the apparatus is obtained.

The apertures are preferably formed by slits extending in the direction of the generatrices of the cylindrical sheath. In a preferred embodiment the axis of the cylindrical sheath is horizontal and the lower half of the sheath is provided with apertures. This has the advantage that the apertures are located at an area where the pressure of the liquid exerted on the sheath is comparatively high, so that the liquid flows back into the cylindrical sheath when the speed of rotation drops below the operational speed of rotation. In order to facilitate the motion of the liquid into and out of the cylindrical sheath, the top of the cylindrical sheath is provided with an exhaust tube. Thus both the braking effect on the apparatus and the conveyance of the liquid out of the sheath are accelerated.

In order that the invention may be readily carried into effect, it will now be described in detail with reference to the accompanying drawing.

Figure 2:
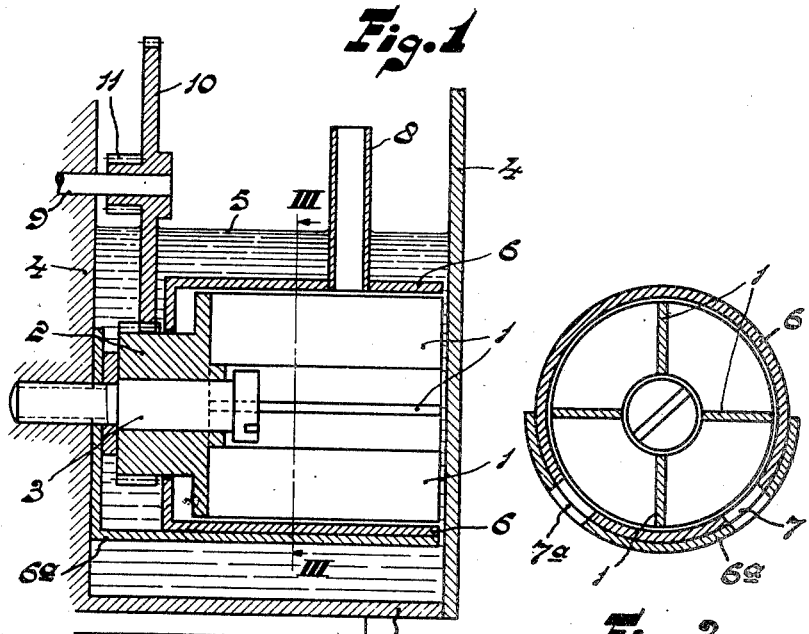
Figure 3:
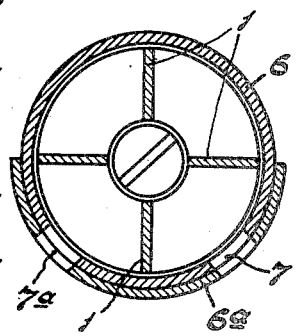

The figures show diagrammatically a braking device according to the invention, of which Fig. 1 is a view of the braking device, Fig. 2 is a cross sectional view taken on the line II—II of Fig. 1 and Fig. 3 is a cross sectional view of the cylindrical sheath and blades taken on the line III—III of Fig. 2.

In the figures the corresponding parts are designated by the same reference numerals. A blade wheel, comprising blades 1 mounted on a tooth gear 2, is journalled so as to be rotatable about a bolt 3. This bolt is secured to one of the walls 4, which form a vessel filled with a liquid 5, for example, oil. For the sake of clearness the front wall of the vessel is shown removed in Fig. 1. The blade wheel is rotatable in the liquid and surrounded by a cylindrical sheath 6, also housed in the vessel, the axis of this sheath being horizontal, the sheath being provided with slits 7 extending in the direction of the generatrices of the sheath and arranged in the lower half thereof. Moreover at a point of the top the sheath is provided with an exhaust pipe 8. The cylindrical sheath is substantially closed at the end surfaces by the tooth gear 2 and the front wall 4 and is secured to and supported by a trough-shaped body 6ª, which is in turn secured to one of the walls 4 by means of the bolt 3. The trough-shaped body is provided with slits 7ª, corresponding to the slits 7. The blade wheel is coupled with the apparatus by means of a tooth gear 10 provided on the driving shaft 9. The remainder of the apparatus is not shown for the sake of simplicity. The teeth 11 engage a driving gear of the apparatus (not shown). At the operational speed of rotation of the apparatus and with a correct choice of the dimensions and the arrangement of the blade wheel, the cylindrical sheath and the slits and of the viscosity of the liquid and the speed of rotation of the blade wheel, this liquid is forced, due to the centrifugal force exerted thereon, through the slits 7 and 7ª and is thus conveyed for the major part out of the cylindrical sheath 6 into the vessel.

An example of correctly chosen dimensions and arrangement referred to above is constituted by a cylindrical sheath of 17 mms. in length and of 17 mms. in internal diameter, provided with two slits having a length of 15 mms. and a width of 2.5 mms. The space between the cylindrical sheath and the blades is in this case 3 mms. The four blades have a length of 14 mms. each and a width of 4 mms. These dimensions were used with an electric motor of about 20 w., the rotor shaft of which performs 2700 revolutions a minute, the blades performing 5400 revolutions a minute. At the operational speed of rotation the loss of energy due to the braking device is about 10% of the motor power and the over-run angle of the electric motor was reduced to about 0.1 after the electrical source of energy had been switched off. The liquid used was silicone oil, having a viscosity of about 12° E.

What I claim is:

1. A liquid brake assembly comprising a vessel containing a filling liquid, a cylindrical sheath communicating with said vessel and comprising an aperture for supplying and discharging said liquid and an open conduit member interconnecting the interior of said sheath to a source of gaseous medium arranged exterior to said liquid, a trough-shaped member secured to a wall of the vessel and intimately engaging and supporting a portion of said sheath, said trough-shaped member having openings corresponding to and aligned with each of said apertures, a blade wheel disposed within said cylindrical sheath, and input power means for rotating said blade wheel, said input power means normally rotating said blade wheel at a speed to cause substantially all of the liquid in said sheath to be discharged by centrifugal action through said apertures and said openings, whereby said blade wheel rotates substantially in said gaseous medium at speeds at least equal to that of said normal rotation and in at least a portion of said liquid at speeds below the speed of normal rotation, said portion of liquid exerting a braking action on said blade wheel.

2. An assembly as set forth in claim 1, wherein said aperture is constituted by a slit extending in the direction of the generatrices of the cylindrical sheath.

3. An assembly as set forth in claim 2, wherein said cylindrical sheath has its axis disposed in a horizontal direction, said aperture being provided in the lower half of said sheath.

4. An assembly as set forth in claim 3, wherein said open conduit member is disposed at the highest point of said cylindrical sheath.

References Cited in the file of this patent

UNITED STATES PATENTS

| | | |
|---|---|---|
| 1,787,437 | Dutton | Jan. 6, 1931 |
| 2,182,076 | Elmer | Dec. 5, 1939 |
| 2,246,657 | Bahan | June 24, 1941 |
| 2,508,217 | Brell | May 16, 1950 |
| 2,550,868 | Russell et al. | May 1, 1951 |
| 2,568,307 | Summers | Sept. 18, 1951 |

FOREIGN PATENTS

| | | |
|---|---|---|
| 578 | Great Britain | Jan. 19, 1910 |